(No Model.) 2 Sheets—Sheet 2.
H. HARRIS.
MACHINE FOR MAKING NUTS.
No. 375,746. Patented Jan. 3, 1888.
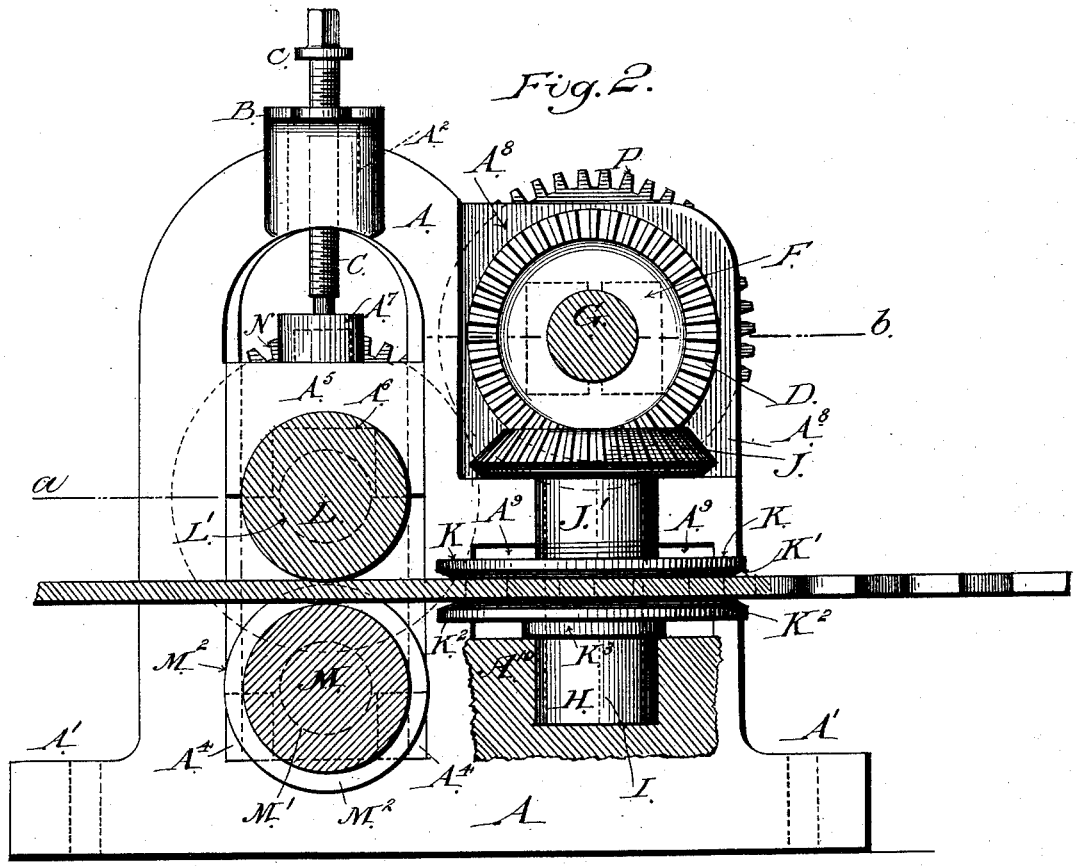
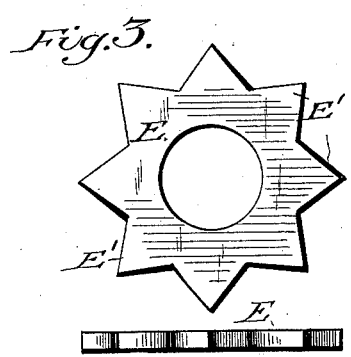
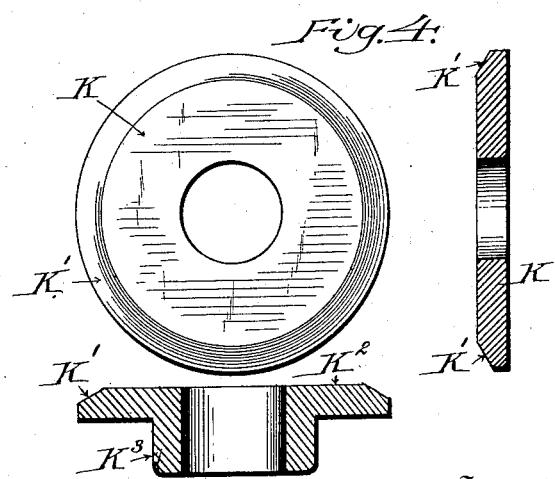
Witnesses
T. W. Fowler
D. L. Clark
Inventor
Henry Harris;
By his Attorney
Thomas P. Kinsey

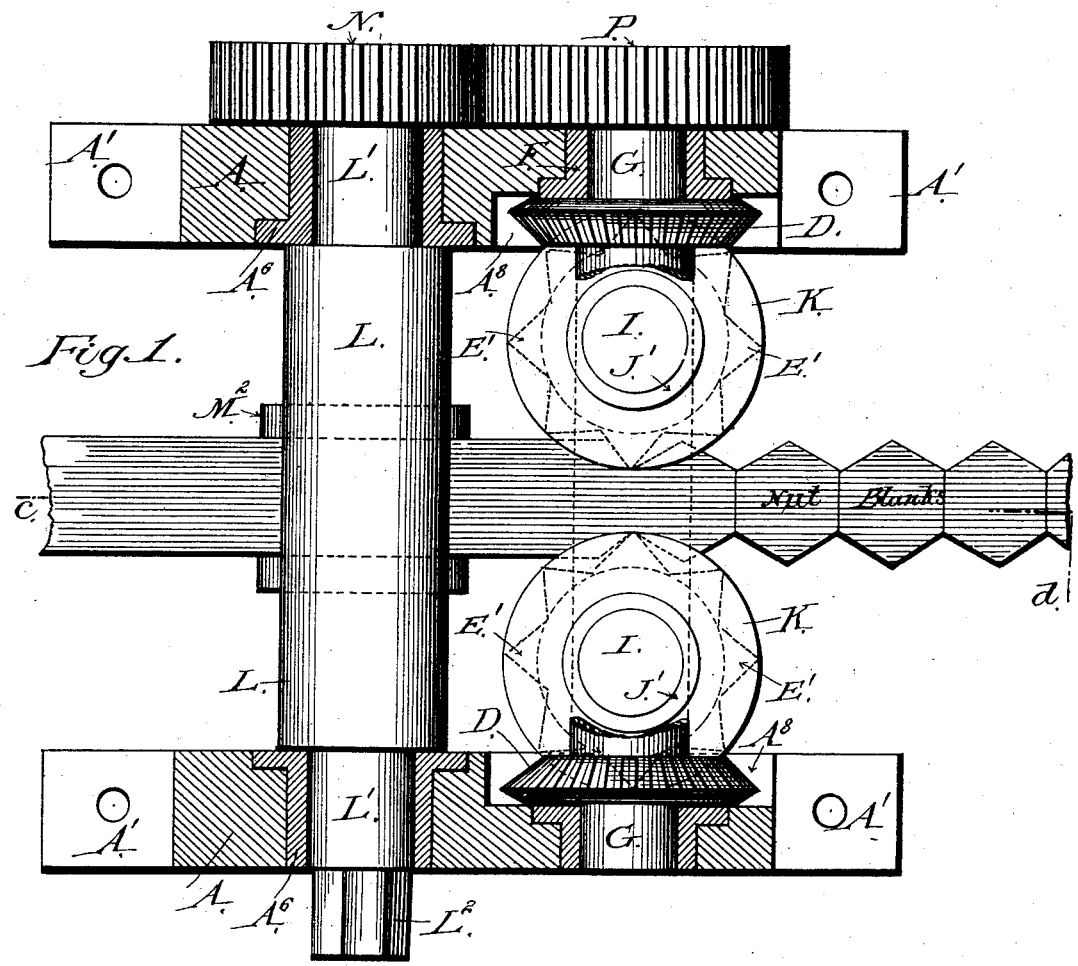

UNITED STATES PATENT OFFICE.

HENRY HARRIS, OF READING, PENNSYLVANIA.

MACHINE FOR MAKING NUTS.

SPECIFICATION forming part of Letters Patent No. 375,746, dated January 3, 1888.

Application filed March 24, 1887. Serial No. 232,242. (No model.)

*To all whom it may concern:*

Be it known that I, HENRY HARRIS, a citizen of the United States, residing at the city of Reading, county of Berks, State of Pennsylvania, have invented a new and useful Improvement in the Manufacture of Hexagon Nuts, of which the following is a specification.

This improvement pertains more particularly to the manufacture of nut-blanks of hexagon form, which are subsequently passed under the ordinary punching-machines, and at one single operation the blank is punched and severed from the bar.

The object of the improvement is to form a more homogeneous nut, and to save scrap, the reheating, rolling, and reworking of the same. In the manufacture, more especially of hexagon or octagon nuts, the waste runs equal to about one-half of the stock—for instance, an order of one hundred tons of hexagon nuts would require two hundred tons of rolled bar to fill the contract. In my mode of manufacture there is no scrap made, except at the extreme ends of the bars, and instead of cutting off the angles of the nut the material is compressed into the body of the nut, thus condensing the material, forming a more homogeneous nut, better adapted for threading than nuts made under the old process.

The accompanying drawings, forming a part of this specification, will show very clearly to an expert the nature of my improvement and the practical value of the same, like letters of reference indicating similar parts throughout.

Figure 1 represents in plan the housings on the line $a\ b$ of Fig. 2, with the rolls in full diameter, and a bar of iron or steel being compressed into nut-blanks, the bevel-wheels J removed, showing the shafts I and portion of hub J' in section; Fig. 2, a central cross-section through the rolls on the line C D of Fig. 1, in which a bar of iron is shown passing between the forming-disks, Fig. 3 representing, in plan and vertical elevation, one of the forming-disks; Fig. 4, a plan of the upper disk, K, with a section of the same upon the left-hand side and a section of the lower disk, $K^2$, below the same.

In the drawings, A represents one of the pair of housings adapted to the manufacture of nuts in accordance with my process provided with feet A', adapted to the usual foundation-plate guides of a mill, the main portion of the housing having the usual nut-boss, $A^2$, nut B, and tightening-screw C, base-journal box $A^4$, rider $A^5$, upper roll-bearing, $A^6$, and breaker $A^7$, the rear integral portion of the housing being recessed at $A^8$ to adapt it to the miter-gears D, and also recessed at $A^9$ to permit the forming-disks E to revolve. Bearings F are provided for the counter-shaft G, and seats $A^{10}$ for bushes H, bored to receive the lower ends of the vertical shafts I, said shafts having keyed or otherwise secured thereon horizontal miter-wheels J, gearing with the respective miter-wheels D. Said gears J are provided with hubs J', made of such depth as to occupy the space upon the shaft between the gear J and upper disk, K, of the forming device, the latter being composed of an upper disk, K, an intermediate forming-disk, E, having peripheral corrugations E', adapted to compress the bar with the proper blanks for the nuts, and a lower disk, $K^2$, having a boss, $K^3$, both disks having an internal beveled face, K'. The bar in process of formation into nut-blanks would, without the use of the disks K $K^2$, be swelled upon the edges, making a deformed blank; but the use of the disks prevents the swelling, and the blanks are made uniform in shape and thickness.

The disks are made, preferably, of steel, and are removably secured to the shafts I, and the thickness of the forming-disks E is changed to suit the thickness of nut-blank to be produced. To admit of this being done within the space allowed for the forming device the lower ends of the hubs J' may be composed of a series of annular rings, which may be removed when a thicker nut-blank is to be rolled and again replaced when a thin nut-blank is to be produced.

The receiving and feeding rolls L and M in the main portion of the housing are constructed as follows: The lower roll, M, has the usual necks or bearings, M', and central to the length of the roll and separated by the width of bar to be operated upon are collars $M^2$, of a height equal to the thickness of the bar, or nearly so, being sure to allow for grip of the same to force the bar forward between the forming-disks.

The upper roll, L, is a plain cylindrical roll from housing to housing, has the usual bearing-necks, L', and at one end the usual joggle, L², by which it is driven, by spindle and box connection, from a suitable motor. At the opposite end, upon the outside of the housing, a spur-gear, N, is suitably secured, which gears into a similar wheel, P, secured to the counter-shaft G, and this positive motion is secured by wheels D and J for the forming device previously described.

The collars M² may be made removably adjustable upon the shaft M, in which case their height would be made to conform with the thickness of nut-blank, while the adjustment for width would be adapted to pass the bar to be operated upon. At the same time the collars may be constructed integral with the shaft. In the latter case a roll would be required for each size of nut manufactured, and the spur-gear N would have to be removed and put upon the changed roll each time that the size of nut was altered. I give preference to the adjustable collars.

The operation of the machine is as follows: The rolls L M are brought together, so that the collars M' are nearly in contact with the roll L, leaving the space between such that the bar of iron or steel to be operated upon will be gripped between the same and advanced toward the forming device, where it will pass between the forming-disks E and receive an equal compressive impulse upon both sides or edges of the bar from the corrugations E', the disks K K² preventing the swelling of the blank during the compression and giving a uniform smooth appearance to both faces of the blanks. The form of the peripheral corrugations E' of the disks E is ascertained experimentally for each size and form of hexagon or octagon nut-blank, and they are so devised that when the nut is sheared from the bar each peripheral face of the nut shall be of equal length. The bars, having been formed into a continuous series of nut-blanks, are subsequently placed under a suitably-combined punch and shear, when, by a simultaneous operation, the blank is punched and sheared from the bar and becomes a commercial nut ready for tapping.

Having shown my improvement and its use, I desire to secure by Letters Patent the following claims thereon:

1. As an improvement in machinery for the manufacturing of nuts, a housing-frame consisting of a front portion provided with the usual roll-neck bearings, riders, breakers, and tightening-screw, and having an integral rear portion provided with bearings for a horizontal shaft, and a seat bored and bushed for a vertical shaft, said rear portion recessed at the top for the reception of driving bevel-gears secured upon the horizontal and vertical shafts, and recessed also upon a line with the center of the front rolls for the reception of the forming device, in combination with the said bevel-gears and their vertical and horizontal shafts, spur-gears P and N, rolls L and M, collars M², and disks K K² E, substantially as set forth.

2. As an improvement in machinery for the manufacture of hexagon or octagon nut-blanks, the vertical shafts I, supported in bushings H at their lower ends, said bushings fitted in a seat integral with the rear portion of the housings, adapted to the operating machinery for the same, said shafts having removably secured thereon a forming device consisting of disks K K², between which are forming-disks E, having a corrugated periphery, E', adapted by their revolution with the shaft I to compress the edges of the bar equally as it is passed between the same, in combination with bevel-wheels J, shaft G, bevels D, spurs P N, roll L, joggles L², roll M, and guide-collars M², all arranged, combined, and adapted to produce nut-blanks, as and for the purpose set forth.

3. In combination with a nut-blank machine, as shown and described, a forming device composed, essentially, of an upper disk, K, having its inner face K' slightly beveled from the points of the forming-disks to the periphery of the disk, a forming-disk, E, the thickness of which is varied to suit the thickness of nut-blanks to be produced, and provided with a series of peripheral corrugations, adapted in unison with each other to compress between them into the proper form for a hexagonal or octagon nut the bar passing through the same, a lower disk, K², beveled at K', to correspond with the upper disk, and having a hub, K³, said disk and formation washers being removably secured upon the shafts I, as and for the purpose set forth.

4. In combination with a nut-blank machine, as shown and described, and the lower roll, M, of the machine, the collars M², adjustable as to separation upon said roll, whereby the space between the same may be adapted to guide the various widths of nut-bars to the forming device, substantially as and for the purpose set forth.

5. As an improvement in machinery for manufacturing nuts, the combination, with a suitable housing having horizontal rolls supported in bearings, of vertical shafts with their lower ends in bearings, and having attached thereto in the same horizontal plane a forming device to compress a rolled flat bar by passing the same through said horizontal rolls, and between said forming-disks into nut-blanks, substantially as shown and described.

HENRY HARRIS.

Witnesses:
JAMES R. KENNEY,
EDWARD A. CLAY.